(12) United States Patent
Arthaber (10) Patent No.: US 8,335,247 B2
(45) Date of Patent: Dec. 18, 2012

(54) METHOD AND APPARATUS FOR MEASURING SIGNAL PHASE SHIFTS

(75) Inventor: Holger Arthaber, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 374 days.

(21) Appl. No.: 12/768,493

(22) Filed: Apr. 27, 2010

(65) Prior Publication Data
US 2010/0303139 A1 Dec. 2, 2010

(30) Foreign Application Priority Data
May 29, 2009 (EP) .................................... 09450106

(51) Int. Cl.
*H04B 3/46* (2006.01)
(52) U.S. Cl. ........................................ 375/226; 375/340
(58) Field of Classification Search .................. 375/316, 375/323–325, 329–337, 340, 226
See application file for complete search history.

(56) References Cited

U.S. PATENT DOCUMENTS

| | | | |
|---|---|---|---|
| 3,120,000 A | | 1/1964 | Wilmotte |
| 3,378,848 A | | 4/1968 | Baylor |
| 5,838,732 A | * | 11/1998 | Carney ........................ 375/297 |
| 2004/0224655 A1 | * | 11/2004 | Petrov et al. ............... 455/226.1 |
| 2010/0008680 A1 | * | 1/2010 | Chen et al. .................... 398/198 |
| 2010/0315170 A1 | * | 12/2010 | Locascio et al. ................ 331/15 |

OTHER PUBLICATIONS

European Search Report dated Nov. 6, 2009, for corresponding European Patent Application No. 09450106.1, 5pp.
Balogh, Laszlo, et al.; "Angle of Arrival Estimation Based on Interferometer Principle"; WISP 2003; Budapest, Hungary; Sep. 4-6, 2003; IEEE; pp. 219-223.

* cited by examiner

*Primary Examiner* — Emmanuel Bayard
(74) *Attorney, Agent, or Firm* — Christie, Parker & Hale, LLP.

(57) ABSTRACT

A method and an apparatus for measuring a phase shift between a first and a second signal, comprising the steps of shifting the first signal in frequency by an offset frequency, superposing the frequency-shifted first signal and the second signal, determining an envelope signal of the superposed signal, and measuring a phase shift of the envelope signal at the offset frequency, or a multiple thereof, with respect to the phase of the offset frequency, wherein the phase shift is measured by determining a Fourier coefficient of the envelope signal at the offset frequency and extracting its phase. The invention further relates to an apparatus implementing the method.

19 Claims, 6 Drawing Sheets

METHOD AND APPARATUS FOR MEASURING SIGNAL PHASE SHIFTS

CROSS-REFERENCE TO RELATED APPLICATIONS

This application claims priority to European Patent Application No. 09 450 106.1, filed on May 29, 2009, the contents of which are hereby expressly incorporated by reference.

BACKGROUND

The present invention relates to a method and an apparatus for measuring the phase shift between a first and a second signal.

Measuring the phase shift between two phase shifted signals is required in many applications like feed-forward amplifiers or the estimation of the direction of arrival (DOA) in array antennas, conf. Bong-Gee Song, Ritcey, J. A., "Maximum Likelihood Estimation of the Angle of Arrival", Antennas and Propagation Society International Symposium, 1994, AP-S. Digest, pp. 1568-1571, Vol. 3, June 1994; or Balogh L. and Kollar, I., "Angle of Arrival Estimation based on interferometer principle", Intelligent Signal Processing, 2003 IEEE International Symposium on, pp. 219-223, September 2003. According to the prior art this is usually done by calculating the correlation between the two signals. However, using a digital approach to this end requires downconversion of both signals, analog-to-digital conversion with high-speed ADCs for wideband signals, and fast signal processing. On the other hand, using an analog approach by e.g. multiplying or mixing the two signals results in an unambiguous measurement range of only 180° and, furthermore, a biased measurement of the phase shift due to DC offsets of the mixer's output which is typically temperature dependent.

SUMMARY

In some aspects, the invention is a method and an apparatus for measuring the phase shift between two signals which can measure phase shifts in an increased unambiguous measurement range. Such methods and apparatus are not subject to measurement errors due to temperature variations and are not influenced by DC offsets occurring in the signal processing paths.

In a first aspect of the invention, a method is provide for measuring a phase shift between a first and a second signal, comprising the following steps:

shifting the first signal in frequency by an offset frequency, superposing the frequency-shifted first signal and the second signal, determining an envelope signal of the superposed signal, and measuring a phase shift of the envelope signal at the offset frequency, or a multiple thereof, with respect to the phase of the offset frequency, wherein the phase shift is measured by determining a Fourier coefficient of the envelope signal at the offset frequency and extracting its phase.

The method of the invention is based on a novel estimation approach for measuring the phase shift of signals by relying on the stochastics of the signals. Nevertheless, the proposed method is fairly independent of the modulation format of the signals and thus particularly useful for many of today's modulation formats such as WLAN or WAVE modulation formats, e.g. according to the standards IEEE 802.11a, 802.11g, 802.11p, 802.11n, et cet. (in the following generally referred to as IEEE 802.11). The invention achieves an unambiguous measurement range of full 360° and, as will be detailed further below, is insensitive to DC offsets or temperature variations of hardware components involved. Above all, the method of the invention can be implemented with very low-complex, low-cost hardware components: Neither high-speed analog-to-digital converters (ADCs) for sampling the entire signal bandwidth nor demodulation stages nor extensive digital signal processing devices are required. The method is based on the self-interference of one signal with a frequency-shifted version of the other, and the estimated measure for the phase shift can be calculated by low-speed, low-cost microcontrollers.

In a first embodiment of the invention the shifting is made by complex vector multiplication with said offset frequency. Alternatively, the shifting can be made by single-sideband modulation with said offset frequency.

In a further variant for signals which are demodulated from radio frequency (RF) signals the shifting is made by demodulating said RF signals with different demodulation frequencies differing by said offset frequency. In this way, a separate oscillator for generating the offset frequency is not necessary.

The superposition of the first and second signals can be made in any feasible way, e.g. by summing/adding or subtracting the signals.

The envelope signal can also be determined in any way known in the art, e.g. by a diode detector, or a power detector determining a linear or logarithmic power measure of the superposed signal. Preferably, the envelope signal is determined as a logarithmic measure of the power of the superposed signal. The latter variant has shown to yield very good results in most cases, as will be detailed later on.

Preferably the measured phase shift is averaged over multiple periods of the offset frequency so that the stochastic nature of the signals can be better exploited for increased accuracy.

According to another embodiment both the determination of the Fourier coefficient as well as the averaging can be done by integrating a complex product of the envelope signal and the offset frequency over multiple periods of the offset frequency.

The method of the invention is well suited for broadband signals having a bandwidth in the range of 10 to 200 MHz, such as e.g. WLAN and WAVE signals according to standard IEEE 802.11, in particular when the offset frequency is in the range of 10 to 200 kHz, preferably 25 to 125 kHz, particularly preferred about 50 kHz. These offset frequencies cause the least possible interference with the subcarriers of such signals.

In a second aspect, the invention is an apparatus for measuring the phase shift between a first and a second signal, comprising:

an oscillator for generating an offset frequency, a frequency shifter connected to the oscillator on the one hand and receiving the first signal on the other hand for shifting the first signal in frequency by said offset frequency, a superposing element connected to the output of the frequency shifter on the one hand and receiving the second signal on the other hand for superposing the frequency-shifted first signal and the second signal, an envelope detector connected to the output of the superposing element for determining an envelope signal of the superposed signal, and a phase gauge connected to the output of the envelope detector on the one hand and to the oscillator on the other hand for measuring the phase of the envelope signal at the offset frequency, or a multiple thereof, with respect to the phase of the offset frequency, wherein the phase gauge is a Fourier transform element determining the Fourier coefficient of the envelope signal at the offset frequency and extracting its phase.

As can be readily seen the apparatus of the invention is of very low hardware complexity. In particular, neither high-speed ADCs nor demodulators nor complicated digital signal processing hardware are required. Nevertheless, a fast and reliable realtime estimate measurement of the phase shift can be achieved throughout a measurement range of full 360°, resistant to DC offsets and temperature variations of hardware components involved.

In case the apparatus does comprise demodulators for signals which need to be demodulated from RF signals, the frequency shifter is preferably constituted by said existing demodulators and these are fed with different demodulation frequencies which differ by said offset frequency.

The envelope detector can be implemented in any way known in the art, e.g. as a diode detector, or a power detector determining the power of the superposed signal in a linear or logarithmic scale. It is of particular advantage if the envelope detector determines the envelope signal as a logarithmic power measure, as will be explained further below.

Preferably the Fourier transform element integrates over multiple periods of the offset frequency in order to average the phase shift measured.

The apparatus—as well as the method—of the invention are well suited for broadband signals of the OFDM-modulated microwave type, e.g. according to WLAN or WAVE standard IEEE 802.11 mentioned above, in particular when the offset frequency is in the range of 10 to 200 kHz, preferably 25 to 125 kHz, particularly preferred about 50 kHz.

SHORT DESCRIPTION OF THE DRAWINGS

The invention will now be described further under reference to embodiments thereof and the enclosed drawings, in which.

DETAILED DESCRIPTION

Figure 1:
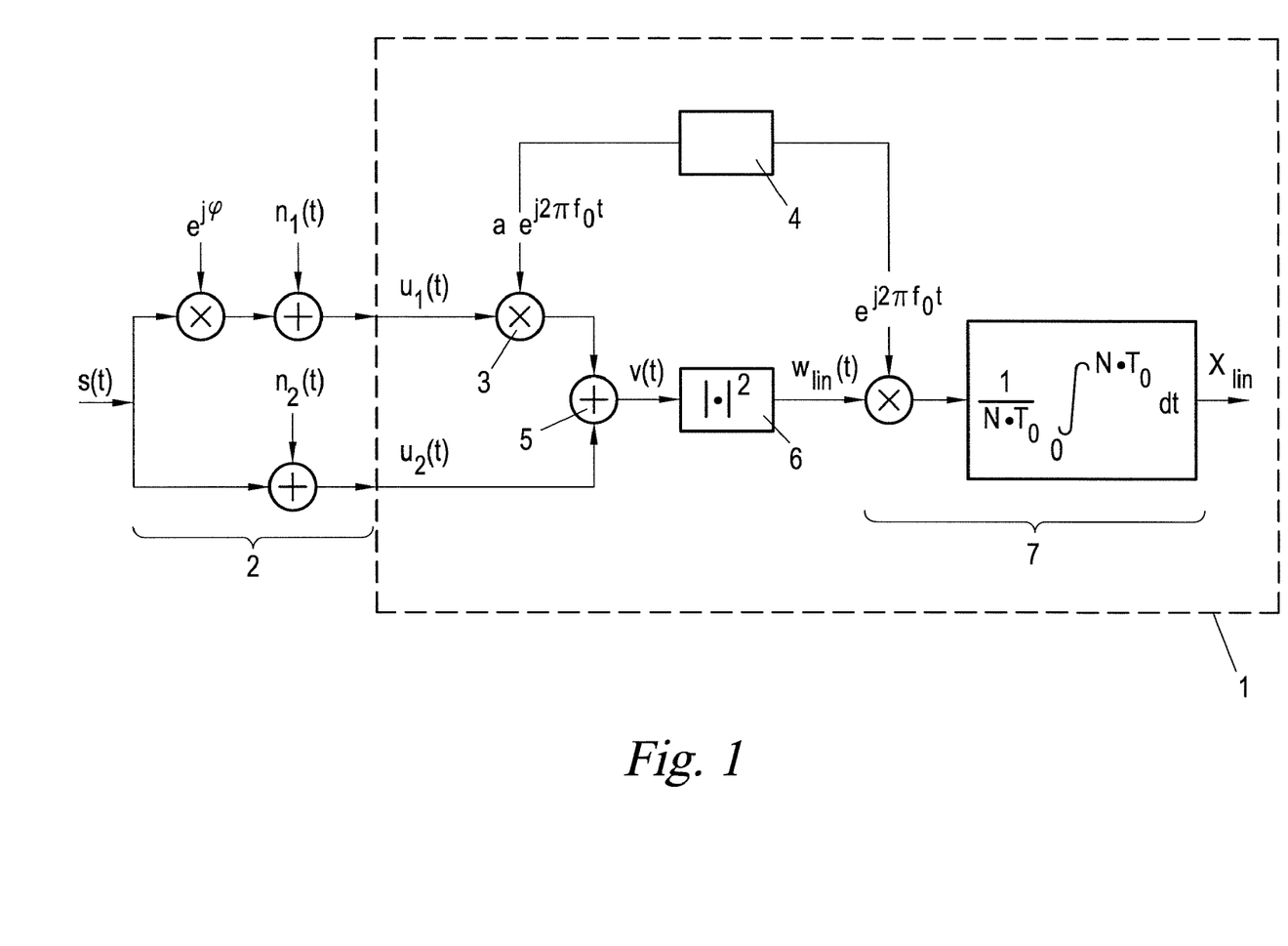
FIG. 1 is a block diagram of a first embodiment of the apparatus of the invention which also explains the steps of the method of the invention.

In FIG. 1 a first embodiment of an apparatus 1 for measuring the phase shift between two signals is represented. All signals and signal paths shown are considered to be complex-valued in the equivalent baseband channel.

As test feed for the apparatus 1 a simplified model of a transmission channel 2 is depicted generating phase shifted input signals $u_1(t)$, $u_2(t)$ from a common source signal $s(t)$ by a phase shift p as:

$$u_1(t)=s(t)e^{jp}+n_1(t) \qquad (1)$$

$$u_2(t)=s(t)+n_2(t) \qquad (2)$$

both having additive white Gaussian noise $n_{1,2}(t)$ added. Noises $n_1(t)$ and $n_2(t)$ are assumed to be uncorrelated with both having the same energy. Furthermore, the signal-to-noise-ratio (SNR) of the inputs is defined as $$SNR_1 = \frac{E\{|u_1(t)|^2\}}{E\{|n_1(t)|^2\}} \qquad (3)$$

$$SNR_2 = \frac{E\{|u_2(t)|^2\}}{E\{|n_2(t)|^2\}} \qquad (4)$$

with $E\{\ \}$ denoting the expectation operator.

In a first stage of the apparatus 1, conforming to a first step of the method of the invention, the signal $u_1(t)$ is shifted in frequency by an offset frequency $f_0$ by means of a frequency shifter 3. Frequency shifter 3 receives offset frequency $f_0$ from an oscillator 4. In practical hardware implementations the frequency shifter 3 can e.g. be implemented as a single-sideband (SSB) modulator or a vector modulator.

In a second stage of the apparatus, or second step of the method, respectively, the output of the frequency shifter 3 is connected to an adder 5, the latter receiving on its second input the second signal $u_2(t)$ in order to add these signals. Here, an amplitude imbalance factor a≈1 (which may occur in a hardware setup) can be taken into account:

$$v(t)=u_1(t)\cdot ae^{j2\pi f_0 t}+u_2(t) \qquad (5)$$

Adder 5 can e.g. be implemented as a 3 dB-Wilkinson divider/combiner. Instead of an adder any other means of superposing the two signals $u_1$ and $u_2$ can be used, e.g. a subtracting element or generally any superposing element which superposes the two signals $u_1$ and $u_2$.

In a third stage, or third step, respectively, the output of the adder 5 is fed into an envelope detector 6. The envelope detector 6 can be implemented in any way known in the art, e.g. as a diode detector, a power detector, or the like. Two preferred embodiments of the envelope detector 6 are considered in detail in the following: In the variant of FIG. 1 the envelope detector 6 is a power detector which measures the power of the summed signal $v(t)$ in a linear scale according to $$w_{lin}(t)=|v(t)|^2 \qquad (6)$$

Figure 2:
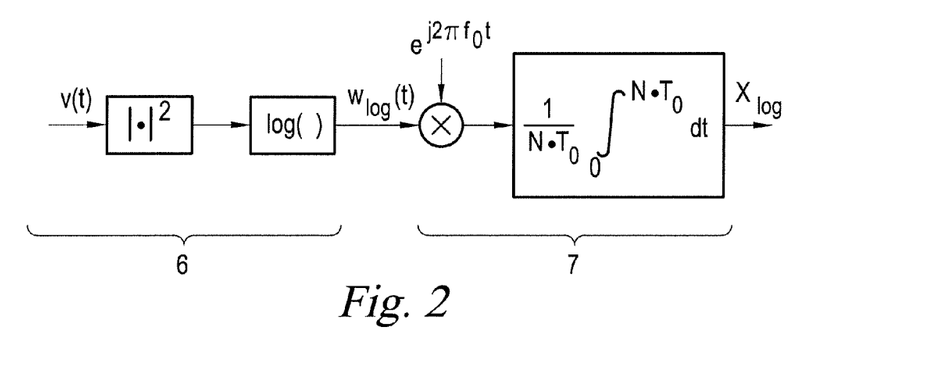
FIG. 2 is a block diagram of a variant of the envelope detector and phase gauge of the embodiment of FIG. 1.

In the alternative variant of FIG. 2 the envelope detector 6 is a power detector which determines the power signal $w(t)$ in a logarithmic scale according to $$w_{log}(t)=\log(|v(t)|^2) \qquad (7)$$

In a fourth stage of the apparatus 1, conforming to a fourth step of the method of the invention, the phase of that frequency component of the envelope signal $w(t)$ which occurs at the offset frequency $f_0$—or a multiple thereof—is measured with respect to the phase of the offset frequency $f_0$. To this end a phase gauge 7 sensitive for this frequency component is used which receives offset frequency $f_0$ from oscillator 4 as a reference.

Phase gauge 7 can implement any suitable frequency-selective phase measurement method known in the art. In the preferred embodiment which is represented in FIGS. 1 and 2 phase gauge 7 is constituted by a Fourier transform element determining the Fourier coefficient X of the envelope signal w(t) at the offset frequency $f_0$, i.e.:

$$X_{lin,log} = \frac{1}{NT_0} \int_0^{NT_0} w_{lin,log}(t) e^{j2\pi f_0^t} dt \qquad (8)$$

with $T_0=1/f_0$ being the period of the offset frequency $f_0$ and N denoting the number of periods $T_0$ used for integrating. In this way, by integrating over multiple (N) periods $T_0$ of the offset frequency $f_0$, phase gauge 7 implicitly averages the measurement over those N periods.

In the present disclosure, the term "Fourier" transform or coefficient, respectively, is considered in its broadest possible sense, including all known variants of Fourier transforms, e.g. Fast Fourier embodiments, as well as all technically equivalent mathematical transforms known in the art.

In the following it will be shown that the phase of the complex Fourier coefficient X can be considered as an estimate measurement of the phase shift between the input signals $u_1(t)$ and $u_2(t)$:

Considering the expectation value $E\{X_{log,lin}\}$ and an estimate for the phase shift $\phi$ under the assumption that s(t) is a random process with flat ("white") power spectral density yields:

$$E\{X_{lin}\} = aE\{|s(t)|^2\} e^{j\phi} \qquad (9)$$

$$\phi_{lin} = arg(E\{X_{lin}\}) = arg(aE\{|s(t)|^2\} e^{j\phi}) = \phi \qquad (10)$$

It can be clearly seen from equation (10) that the maximum likelihood estimator $\phi_{lin}$ is unbiased and, therefore, equals the true value of $\phi$.

The calculation of the phase estimate $\phi_{log}$ after the logarithmic envelope detector 6 of FIG. 2 becomes somewhat more complicated because of the non-linear log( )-function resulting in a transformation of random variables. Nevertheless, the estimate for $E\{X_{log}\}$ can be calculated, except for an unknown factor k depending on a, $E\{|n_{1,2}(t)|^2\}$, and the statistic properties of s(t) (including higher order statistic moments if not white):

$$E\{X_{log}\} = ke^{j\phi} \qquad (11)$$

$$\phi_{log} = arg(E\{X_{log}\}) = arg(ke^{j\phi}) = \phi \qquad (12)$$

Hence, the phase shift estimate $\phi_{log}$ is also unbiased.

As the estimate $\phi_{lin,log}$ only depends on $arg(E\{X_{lin,log}\})$ a knowledge of the signal's mean power $E\{|s(t)|^2\}$ and amplitude imbalance a is not required. Of course the variance of the estimator is influenced by them but not the expectation value.

Furthermore, since $\phi_{lin,log}$ is determined by calculating a single Fourier coefficient (spectral component) at $f_0$, an offset or DC component, respectively, therefore, does not have influence onto $\phi_{lin,log}$. This is a very important asset which makes a hardware implementation of the proposed method and apparatus insensitive to DC offset drifts caused by temperature variations.

EXAMPLE

For verifying the performance of the method and apparatus of the invention their application onto an IEEE 802.11p signal was analyzed. This is e.g. a typical application scenario for estimating the wave's angle of arrival in a two element array antenna.

Figure 3:
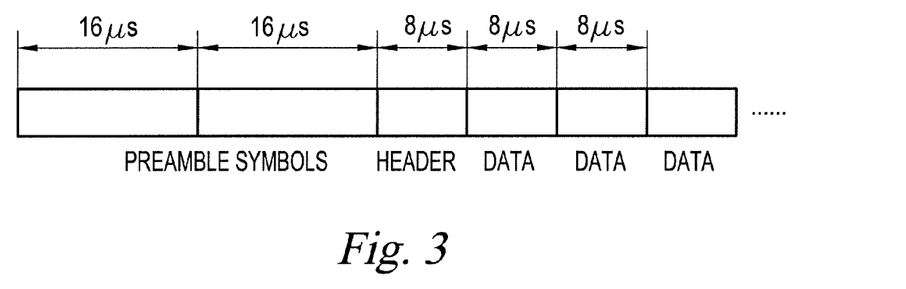
FIG. 3 shows the frame structure of a data packet according to standard IEEE 802.11p used as a broadband input signal.

Standard IEEE 802.11p uses a 8.3 MHz wide channel at one of the center frequencies $f_c=(5860+n\cdot10)$ MHz with n= 0 . . . 6. Orthogonal frequency division multiplex (OFDM) is applied with 52 subcarriers (four of them are pilot carriers). Modulation of the subcarriers can be selected from BPSK, QPSK, 16-QAM, and 64-QAM with coding rates of ½, ⅔, and ¾ and, thus, resulting in data rates of 3 . . . 27 MBit/s. The frame structure is shown in FIG. 3. Each frame starts with a 32 μs long preamble consisting of two fixed but different OFDM symbols (BPSK-modulated), an 8 μs header OFDM symbol (BPSK modulated) which indicates frame length and modulation format, and a series of 8 μs OFDM data symbols (selectable modulation). The first data symbol also carriers 16 bits reserved for future use.

Due to the deterministic nature of the preamble a performance degradation of the method and apparatus of the invention should be expected if preamble and header are included in the observation time. Thus, simulations were performed with and without including the preamble and header.

When using the entire minimum frame length of 40 μs for the measurement of $\phi$ the frequency shift $f_0$ should be $f_0=n/40$ μs=n·25 kHz; If a single OFDM symbol shall be used for the measurement then $f_0=n/8$ μs=n·125 kHz. In the simulations a value of $f_0=50$ kHz was chosen: This allows to take use of integrated ADCs and DACs of low-cost microcontrollers on the one hand and results in an integration time of $T_0=1/50$ kHz=20 μs on the other hand which corresponds to 2.5 OFDM symbols. Furthermore, QPSK-modulation with R=¾ was selected. It turned out that the results were almost independent on the chosen modulation format. The number of integration periods N was varied by N∈{1, 2, 5, 10}. This corresponded to the following minimum data payloads of Table I (wherein values in brackets indicate minimum number of required data bits if preamble and header-symbol are not used):

TABLE I

Minimum Number of Data Bits Required for a Given N

| N | BPSK, R = 1/2 | QPSK, R = 3/4 | 64-QAM, R = 3/4 |
|---|---|---|---|
| 1 | 0 (3) | 0 (51) | 0 (195) |
| 2 | 0 (51) | 0 (195) | 0 (627) |
| 5 | 147 (243) | 483 (771) | 1491 (2355) |
| 10 | 435 (531) | 1347 (1635) | 4083 (4947) |

Hardware Implementation Model

Figure 4A:
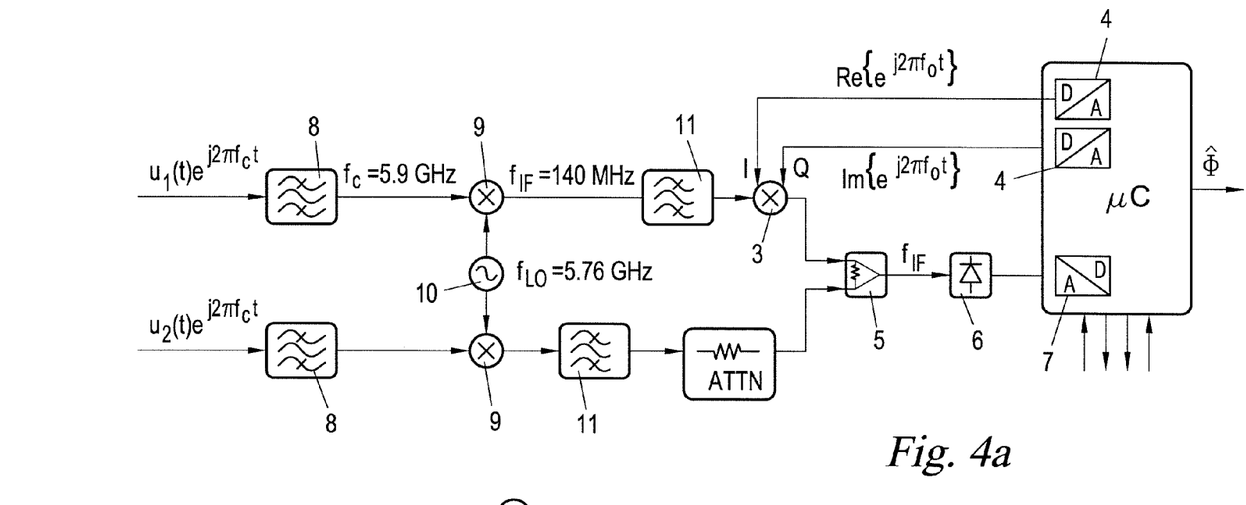
FIG. 4*a* is a block diagram of an exemplary hardware implementation of the apparatus and method of the invention.

For the simulations a hardware implementation was assumed as shown in FIG. 4a, realizing a typical RF frontend for a multichannel system.

A first filter stage 8 preselected the desired frequency band for IEEE 802.11p. Demodulators 9 fed by a local oscillator 10 providing the modulation frequency $f_{LO}$ were used to demodulate RF input signals down to the first and second signals $u_1$, $u_2$. Intermediate frequency (IF) filters 11 were used to select one of the seven sub channels. As frequency shifter 3 a complex vector modulator was used from the type ADL5390 of Analog Devices. The adder 5 was implemented as a 3 dB-Wilkinson divider/combiner, and the envelope detector 6 was a logarithmic power detector with >70 dB dynamic range of the type HMC601LP4 of Hittite in order to support a wide dynamic range of input signals. Oscillator 4 as well as phase gauge 4 were implemented by an Intel 8051-compatible microcontroller MC from Silicon Laboratories.

Figure 4B:
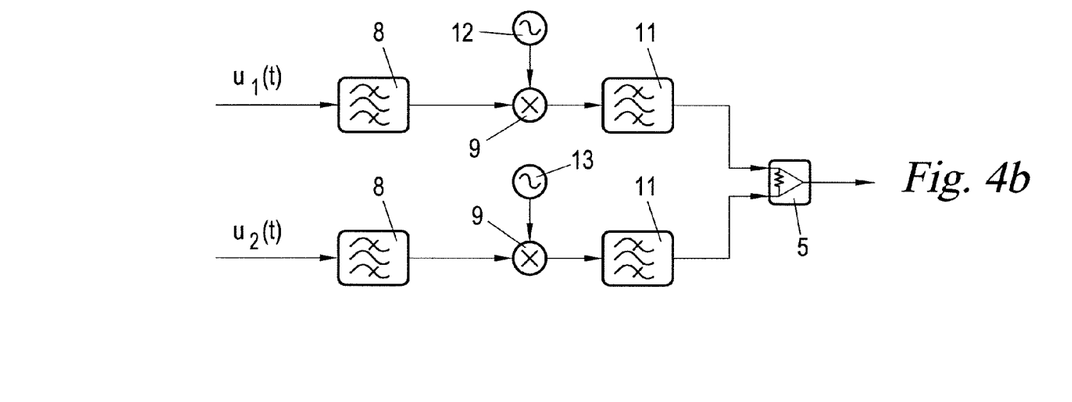
FIG. 4*b* is a block diagram of a variant of the frequency shifter of the embodiment of FIG. 4*a*.

FIG. 4b shows a variant of the hardware implementation embodiment of FIG. 4a wherein frequency shifting of the first signal $u_1$ was achieved by means of the demodulators 9 per se. To this end, demodulators 9 were fed by separate local oscillators 12, 13 the local oscillation frequencies $f_{LO}$ of which differed by the offset frequency $f_0$, i.e. $f_{LO,2}=f_{LO,1}\pm f_0$. In this way, the demodulators 9, together with their local oscillators 12, 13, formed the frequency shifter 3. For stability reasons the frequencies $f_{LO,1}$, $f_{LO,2}$ of the oscillators 12, 13 could be derived from a common oscillator frequency base, e.g. from the microcontroller μC.

Simulation Setup

Figure 5:
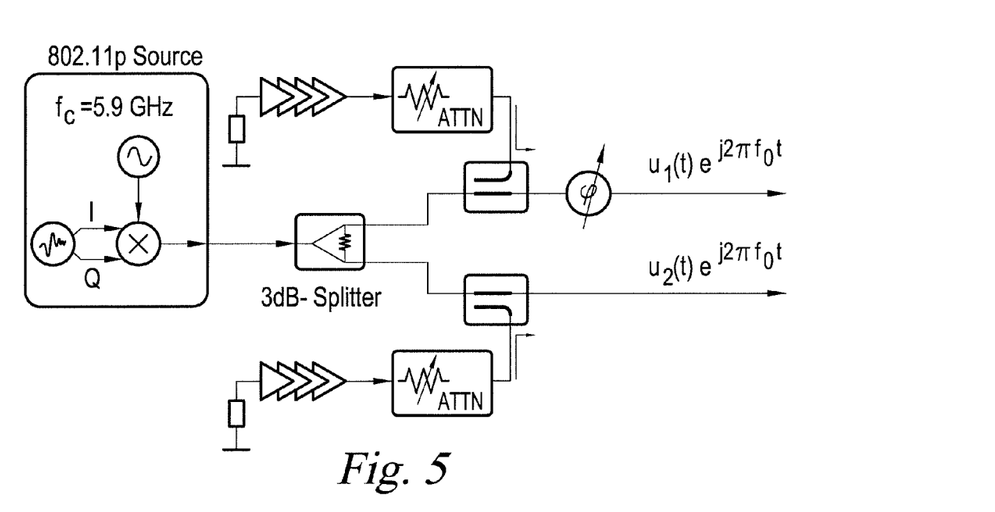
FIG. 5 is a block diagram of an exemplary signal generator for generating test signals as inputs for the methods and apparatus of the invention.

For the simulations an IEEE 802.11p test signal was generated by an RF source and split into two signals with one signal passing a manual phase shifter, see FIG. 5. For adding uncorrelated noise to both channels and for setting the SNR two series of high gain amplifiers were added to the signals by step attenuators and directional couplers. No band-limiting of the noise was done because the hardware implementation already had a band-limiting filter at the input and a channel-selection filter at the IF frequency.

In the simulations at least $10^5$ measurement runs were performed in order to achieve high accuracy of the statistical measures of the phase φ. The simulation was entirely controlled by a MATLAB code; only the phase-shift had to be set manually.

Simulation Results

Figure 6:
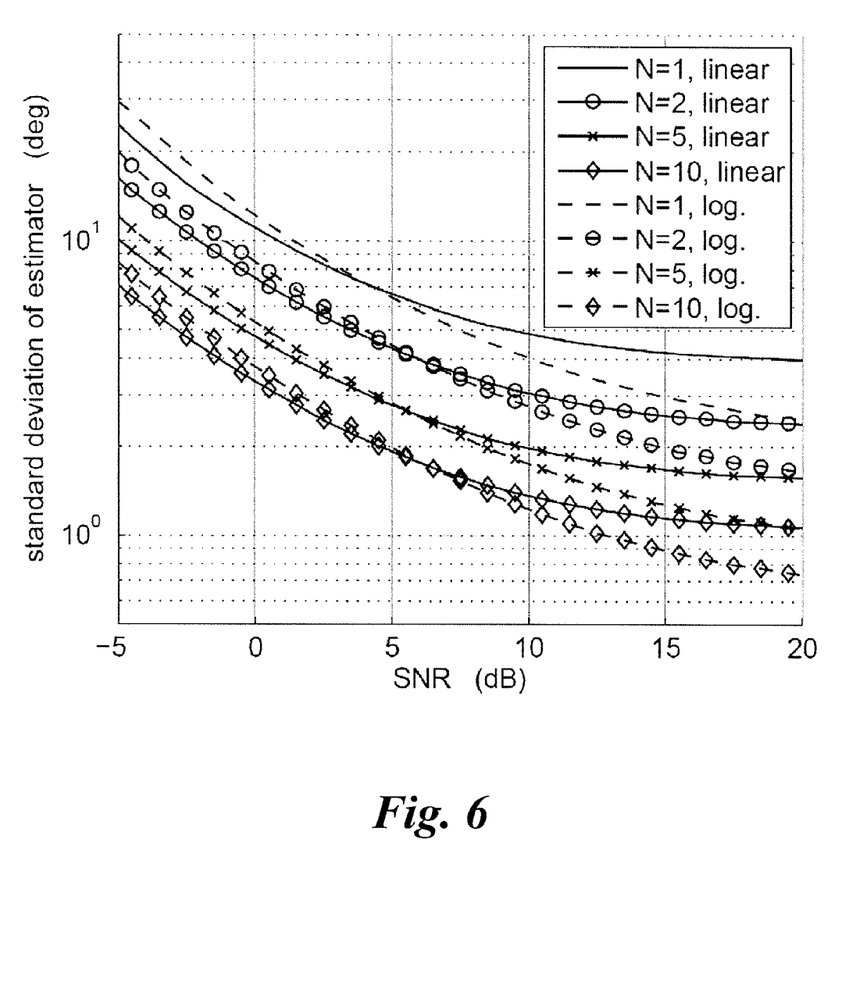
FIG. 6 is a graph showing the performance of the method and apparatus of the invention by comparing several linear and logarithmic variants of the envelope detector.

As a first test, the performance of both embodiments, FIG. 1 ($\phi_{lin}$) and FIG. 2. ($\phi_{log}$), was compared by simulation and the result is shown in FIG. 6. The test was run on OFDM data symbols only, neglecting the influence of preamble and header. The result from FIG. 6 was astonishing: Due to the non-linear transformation of the random variables it happened that the standard deviation of the apparatus using the logarithmic power detector (FIG. 2) had a better performance than the linear variant of FIG. 1 for SNR>5 dB. Keeping in mind that the required SNR for a correct demodulation is in the range of 5 to 20 dB (depending on modulation and coding rate), the logarithmic power detector should be preferred as envelope detector.

The comparison of both variants' bias was not necessary as both variants were expected to be unbiased, see equations (10) and (12). This was verified by simulations as well.

Figure 7:
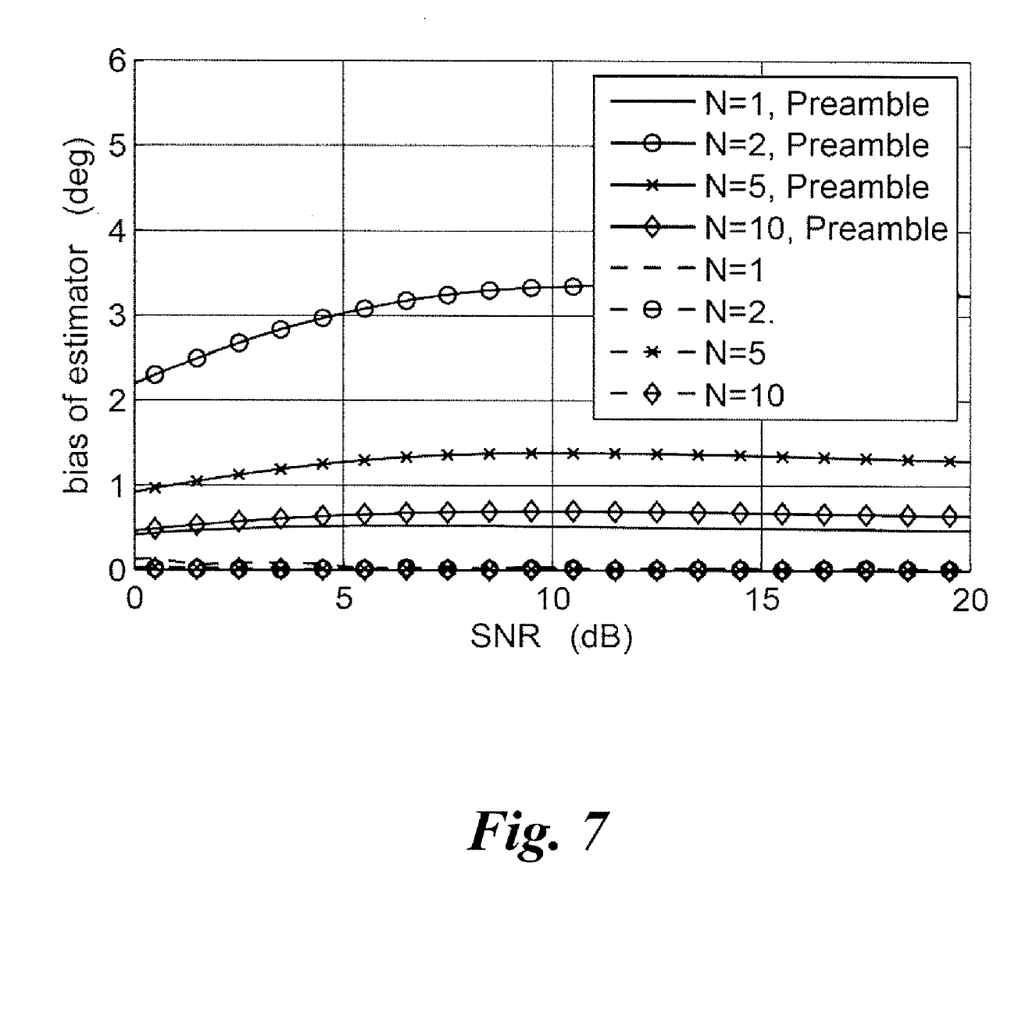
FIG. 7 is a graph showing the effect of including or excluding the preamble of an IEEE 802.11p data packet onto the bias of the phase shift measured.
Figure 8:
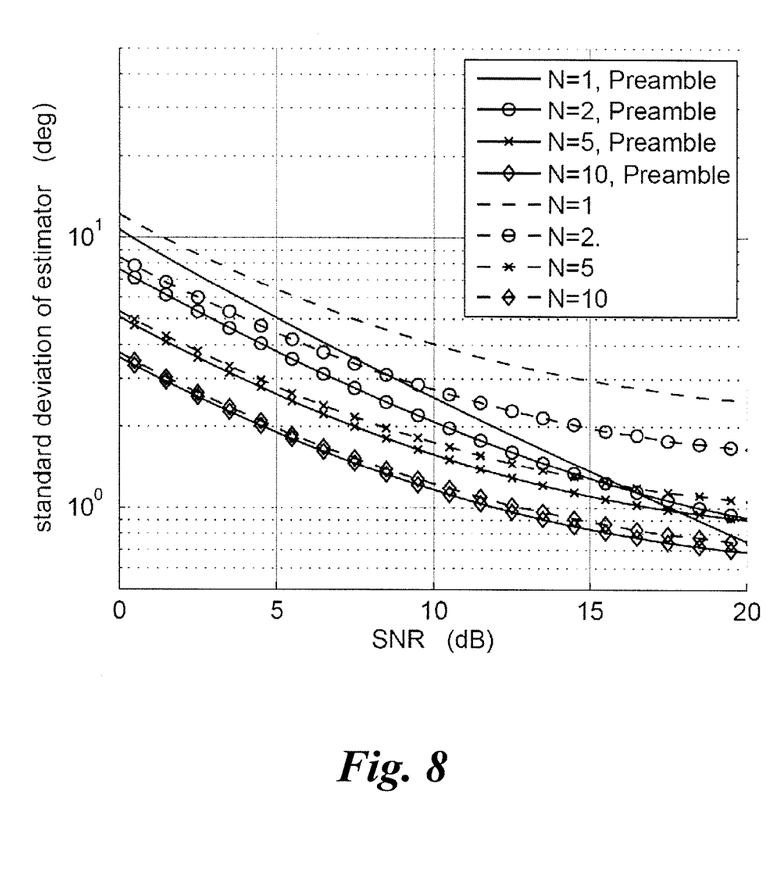
FIG. 8 is a graph showing the effect of including or excluding the preamble of an IEEE 802.11p data packet onto the standard deviation of the phase shift measured.

As a second test the influence of preamble and header was investigated. In this test both the bias (FIG. 7) and the standard deviation (FIG. 8) of the measured phase φ were determined for both variants (FIGS. 1 and 2). FIGS. 7 and 8 clearly indicate, as expected, the preamble's and header's negative influence onto the performance of the method and the apparatus of the invention. It is interesting to note that the maximum error occurred at N=2, which can be explained as follows: Using N=1 results in an integration time of $T=T_0=20$ μs which covers only parts of the preamble. Due to the deterministic preamble signal it happened in the special case of $f_0=50$ kHz that the power spectral density of $w_{log}(t)$ at 50 kHz did not depend on the signal s(t) and, therefore, the result $\phi_{log}$ was unbiased. Increasing N also increased the integration time $NT_0$: For N=2 a phase bias of up to 3.5° could be observed which reduced with increasing N but did not reduce with increasing SNR. The latter effect was a consequence of the bias determined only by the properties of the preamble and header of s(t) and not by the noise. Increasing N included more and more random data OFDM symbols, hence, was "whitening" the power spectral density of s(t) and therefore reducing the bias of the phase measurement.

FIG. 8 indicates that the standard deviation was lower in the case of including the preamble and header, which seems clear: Having partly deterministic input signals reduced variance. The straight line for N=1 with preamble and header supported the above explanation on the bias: Due to $\phi_{log}$ not being influenced by the properties of s(t) in that special case, a linear interrelation with the SNR could be expected.

The invention is not limited to the exemplary and preferred embodiments disclosed herein but encompasses all variants and modifications thereof falling into the scope of the appended claims.

The invention claimed is:

1. A method for measuring a phase shift between a first and a second signal, the method comprising:
   electronically shifting the first signal in frequency by an offset frequency;
   electronically superposing the frequency-shifted first signal and the second signal;
   electronically determining an envelope signal of the superposed signal; and
   measuring a phase shift of the envelope signal at the offset frequency, or a multiple thereof, with respect to the phase of the offset frequency,
   wherein the phase shift is measured by determining a Fourier coefficient of the envelope signal at the offset frequency and extracting a phase of said Fourier coefficient.

2. The method of claim 1, wherein the measured phase shift is averaged over multiple periods of the offset frequency.

3. The method of claim 2, wherein the Fourier coefficient is determined and the averaging is performed by integrating a complex product of the envelope signal and the offset frequency signal over multiple periods of the offset frequency.

4. The method of claim 1, wherein the envelope signal is determined as a logarithmic measure of a power of the superposed signal.

5. The method of claim 1, wherein the shifting is electronically performed by complex vector multiplication with said offset frequency.

6. The method claim 1, wherein the shifting is electronically performed by single-sideband modulation with said offset frequency.

7. The method of claim 1, wherein the first and second signals are demodulated from RF signals, and wherein the shifting is electronically performed by demodulating said RF signals with different demodulation frequencies differing by said offset frequency.

8. The method of claim 1 for broadband signals having a bandwidth in the range of 10 to 200 MHz, wherein the offset frequency is in the range of 10 to 200 kHz.

9. The method of claim 1 for broadband signals which are OFDM-modulated microwave signals according to WLAN- or WAVE-standard, wherein the offset frequency is in the range of 10 to 200 kHz.

10. The method of claim 8, wherein the offset frequency is in the range of 25 to 125 kHz.

11. The method of claim 8, wherein the offset frequency is approximately 50 kHz.

12. An apparatus for measuring a phase shift between a first and a second signal comprising:
   an oscillator for generating an offset frequency;
   a frequency shifter coupled to the oscillator for receiving the first signal and for shifting the first signal in frequency by said offset frequency;
   a superposing element coupled to an output of the frequency shifter for receiving the second signal, and for superposing the frequency-shifted first signal and the second signal;

an envelope detector coupled to an output of the superposing element for determining an envelope signal of the superposed signal; and a phase gauge coupled to an output of the envelope detector and to the oscillator for measuring the phase of the envelope signal at the offset frequency, or a multiple thereof, with respect to the phase of the offset frequency, wherein the phase gauge is a Fourier transform element determining the Fourier coefficient of the envelope signal at the offset frequency and extracting a phase of said Fourier coefficient.

13. The apparatus of claim 12, wherein the Fourier transform element integrates over multiple periods of the offset frequency.

14. The apparatus of claim 13, wherein the Fourier coefficient is determined and an averaging is performed by integrating a complex product of the envelope signal and the offset frequency signal over multiple periods of the offset frequency.

15. The apparatus claim 12, wherein the envelope detector determines the envelope signal as a logarithmic power measure.

16. The apparatus of claim 12, further comprising first and second demodulators for said first and second signals, wherein the frequency shifter comprises said demodulators which are fed with different demodulation frequencies differing by said offset frequency.

17. The apparatus of claim 12 for broadband signals which are OFDM-modulated microwave signals according to WLAN- or WAVE-standard, wherein the offset frequency is in the range of 10 to 200 kHz.

18. The apparatus of claim 17, wherein the offset frequency is in the range of 25 to 125 kHz.

19. The apparatus of claim 18, wherein the offset frequency is approximately 50 kHz.

* * * * *